US007710383B2

(12) United States Patent
Fujita

(10) Patent No.: US 7,710,383 B2
(45) Date of Patent: May 4, 2010

(54) ELECTRO-OPTICAL DEVICE, METHOD OF DRIVING ELECTRO-OPTICAL DEVICE, AND ELECTRONIC APPARATUS

(75) Inventor: Shin Fujita, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 1316 days.

(21) Appl. No.: 11/188,763

(22) Filed: Jul. 26, 2005

(65) Prior Publication Data

US 2006/0077168 A1 Apr. 13, 2006

(30) Foreign Application Priority Data

Oct. 7, 2004 (JP) ............................ 2004-294582

(51) Int. Cl.
*G06F 3/038* (2006.01)
*G09G 5/00* (2006.01)
*G09G 3/36* (2006.01)

(52) U.S. Cl. ...................... 345/100; 345/204; 345/698; 345/699; 345/98; 345/99

(58) Field of Classification Search .................. 345/10, 345/56–68, 79, 87, 92, 98–100, 204–212, 345/698, 699; 250/208.1, 236; 313/422; 315/366; 347/116; 348/E3.015; 358/409–412, 358/482–496; 359/900
See application file for complete search history.

(56) References Cited

U.S. PATENT DOCUMENTS 4,962,374 A * 10/1990 Fujioka et al. ................ 345/79
5,568,163 A * 10/1996 Okumura .................... 345/100
6,380,919 B1 * 4/2002 Koyama et al. ............... 345/92
6,670,943 B1 12/2003 Ishii et al.
6,876,339 B2 4/2005 Hiroki
7,042,433 B1 * 5/2006 Kubota et al. ............... 345/100
7,050,034 B2 * 5/2006 Uchino et al. ................. 345/99
7,224,341 B2 5/2007 Ishii et al.
2002/0163493 A1 11/2002 Matsushima et al.
2003/0193465 A1 * 10/2003 Ohkawa et al. ............. 345/100
2004/0066361 A1 * 4/2004 Ishii et al. ..................... 345/87
2004/0160406 A1 * 8/2004 Yamazaki et al. ........... 345/100
2005/0099379 A1 * 5/2005 Iisaka ......................... 345/100

FOREIGN PATENT DOCUMENTS

CN 1308311 A 8/2001
JP A-2000-227784 8/2000
JP A 2001-249639 9/2001

* cited by examiner

*Primary Examiner*—Alexander S Beck
(74) *Attorney, Agent, or Firm*—Oliff & Berridge, PLC

(57) ABSTRACT

A method of driving an electro-optical device that has a plurality of pixel circuits provided so as to correspond to intersections of a plurality of scanning lines and a plurality of data lines, a first scanning line driving circuit for selecting odd-numbered scanning lines, a second scanning line driving circuit for selecting even-numbered scanning lines, and a data line driving circuit for supplying data signals corresponding to the selected scanning line through the data lines. The method includes, in a first mode, supplying enable signals having different phases to the first and second scanning line driving circuits, respectively, so as to alternately select odd-numbered and even-numbered scanning lines, and, in a second mode different from the first mode, supplying enable signals having the same phase to the first and second scanning line driving circuits, respectively, so as to simultaneously select adjacent odd-numbered and even-numbered scanning lines two by two.

2 Claims, 12 Drawing Sheets

<NORMAL RESOLUTION MODE>

ELECTRO-OPTICAL DEVICE, METHOD OF DRIVING ELECTRO-OPTICAL DEVICE, AND ELECTRONIC APPARATUS

This application claims the benefit of Japanese Patent Application No. 2004-294582 filed Oct. 7, 2004. The entire disclosure of the prior application is hereby incorporated by reference herein in its entirety.

BACKGROUND

The present invention relates to an electro-optical device that can change a display resolution.

In an electronic apparatus, such as a cellular phone, with an increase of the information amount, it is necessary to display an image with a high density. Accordingly, a resolution of a display device has been increasing every year. On the other hand, since the information transfer rate in a communication apparatus is insufficient and thus it is difficult to distribute high-resolution moving pictures, there are cases in which low-resolution images are distributed.

When the low-resolution images are displayed on a high-resolution display device, the display is made using only a portion of a screen, and thus a resolution conversion device is required. As the resolution conversion device, generally, a digital signal processor (DSP) or the like has been used. In this case, however, an increase in cost, a delay of the conversion process, or the like may occur.

For this reason, a technique has been suggested, in which a modulated clock signal is used as a clock signal to a shift register in order to select scanning lines and the scanning lines are sequentially selected two by two, such that the resolution in a scanning direction becomes a half (see Japanese Unexamined Patent Application Publication No. 2001-249639 (FIG. 4)).

However, in the above-described configuration, the modulated clock signal, which is used to display the low-resolution image, needs to have a different duty ratio from a reference clock signal, which is used to display a normal high-resolution image. For this reason, actually, the modulated clock signal needs to be generated from the reference clock signal or needs to be separately generated from the reference clock signal. As a result, the configuration is complicated.

SUMMARY

An advantage of the invention is that it provides an electro-optical device that can implement a configuration for converting a resolution with ease and simplicity and an electronic apparatus.

According to an aspect of the invention, there is provided a method of driving an electro-optical device that has a plurality of pixel circuits provided so as to correspond to intersections of a plurality of scanning lines and a plurality of data lines, a first scanning line driving circuit for selecting odd-numbered scanning lines in a predetermined sequence among the plurality of scanning lines, a second scanning line driving circuit for selecting even-numbered scanning lines in the predetermined sequence among the plurality of scanning lines, and a data line driving circuit for supplying data signals corresponding to grayscale levels of pixels to pixel circuits corresponding to the selected scanning line through the data lines. Each of the first and second scanning line driving circuits has a shift register that generates logic signals for selecting the scanning lines in the predetermined sequence through a shift operation of a pulse signal by a clock signal and an output control circuit that narrows the logic signals to pulse widths of enable signals and outputs the logic signals as scanning signals for selecting the scanning lines. The method of driving an electro-optical device includes, in a first mode, supplying enable signals having different phases to the first and second scanning line driving circuits, respectively, so as to alternately select odd-numbered and even-numbered scanning lines, and, in a second mode different from the first mode, supplying enable signals having the substantially same phase to the first and second scanning line driving circuits, respectively, so as to simultaneously select adjacent odd-numbered and even-numbered scanning lines two by two. In accordance with the aspect of the invention, only by adjusting the phase of the clock signal or the enable signal, the resolution in the vertical scanning direction can be changed.

According to the aspect of the invention, it is preferable that the clock signals in the first and second scanning line driving circuits have the substantially same phase in the first and second modes. In this case, the enable signals may be pulse signals having a duty ratio of about 50%. Further, the phase of the enable signal supplied to the second scanning line driving circuit may be shifted by about 180 degrees with respect to the phase of the enable signal supplied to the first scanning line driving circuit.

Further, the output control circuit may have a first circuit group that narrows the logic signals to a pulse width of a first enable signal so as to select a first group of scanning lines and a second circuit group that narrows the logic signals to a pulse width of a second enable signal having a phase shifted by 180 degrees from the phase of the first enable signal so as to select a second group of scanning lines. In the first mode, the output control circuit may shift the phases of the first and second enable signals supplied to the first scanning line driving circuit and the phases of the first and second enable signals supplied to the second scanning line driving circuit by about 90 degrees and may supply the first and second enable signals to the first and second scanning line driving circuits. Further, in the second mode, the output control circuit may cause the phases of the first and second enable signals supplied to the first scanning line driving circuit and the phases of the first and second enable signals supplied to the second scanning line driving circuit to be the substantially same phase and may supply the first and second enable signals to the first and second scanning line driving circuits.

Moreover, the invention can be conceptualized as an electro-optical device and an electronic apparatus, in addition to the method of driving an electro-optical device.

BRIEF DESCRIPTION OF THE DRAWINGS

The invention will be described with reference to the accompanying drawings, wherein like numbers reference like elements, and wherein.

DETAILED DESCRIPTION OF EMBODIMENTS

Hereinafter, an embodiment of the invention will be described with reference to the accompanying drawings. An electro-optical device according to the present embodiment has a configuration that an element substrate, on which various transistors or pixel electrodes are formed, and a transparent counter substrate having a common electrode are bonded to each other at a constant gap and liquid crystal is interposed in the gap.

Figure 1:
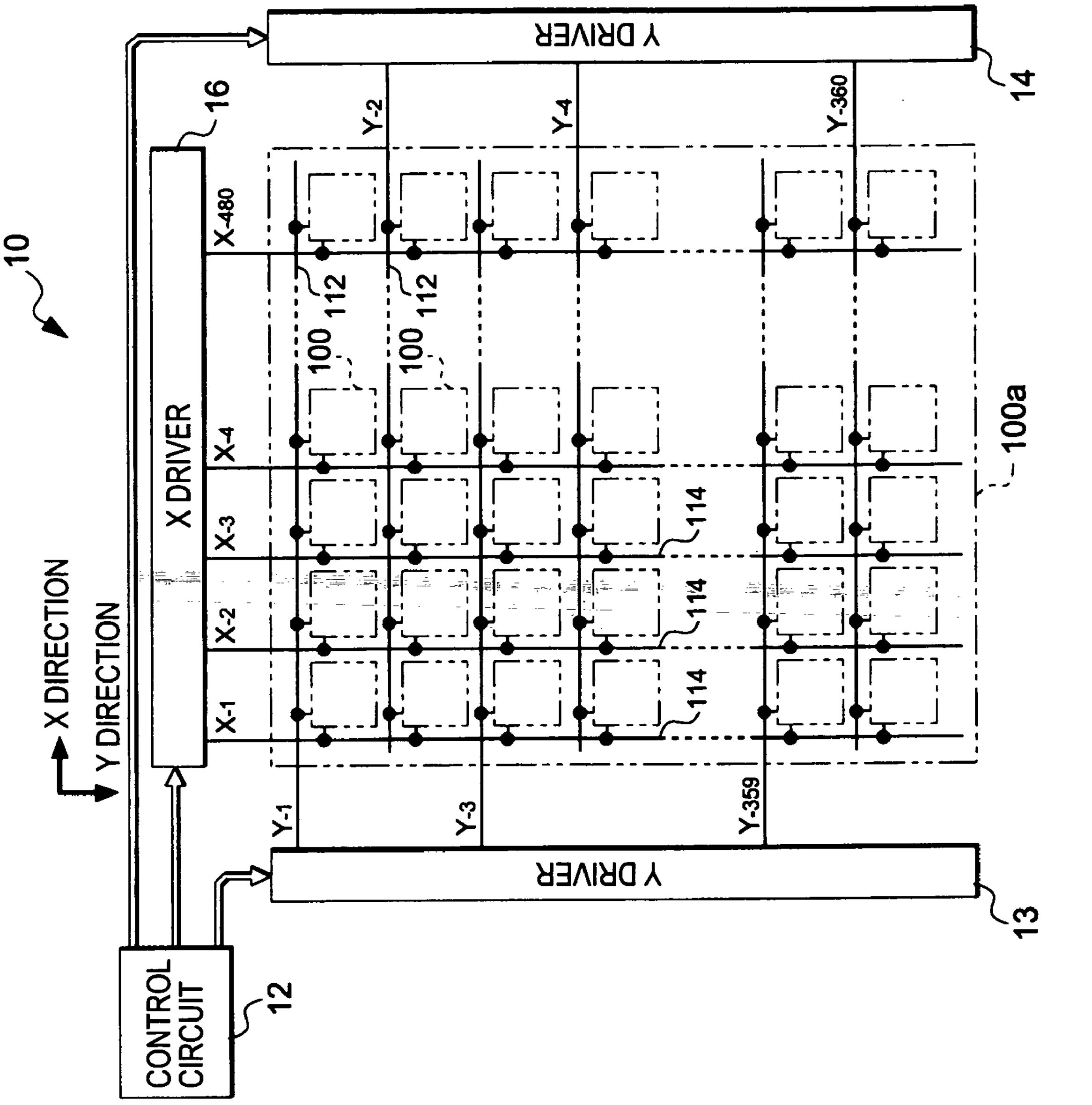
FIG. 1 is a block diagram showing a configuration of an electro-optical device according to a first embodiment of the invention.

FIG. 1 is a block diagram showing an electrical configuration of an electro-optical device 10 according to the present embodiment.

As shown in FIG. 1, the electro-optical device 10 has a control circuit 12, Y drivers 13 and 14, and an X driver 16. In the electro-optical device 10, 360 scanning lines 112 extend in a horizontal direction (X direction) and 480 data lines 114 extend in a vertical direction (Y direction). In addition, pixel circuits 100 are arranged so as to correspond to intersections of the scanning lines 112 and the data lines 114. Therefore, the pixel circuits 100 according to the present embodiment are arranged in a matrix shape of 360 rows×480 columns so as to form a pixel region 100*a*.

According to the present embodiment, there are two resolution modes, that is, a normal resolution mode (first mode) in which a vertical resolution is a resolution corresponding to 360 lines and a low resolution mode (second mode) in which the vertical resolution is a resolution corresponding to a half of the normal resolution mode, that is, 180 lines. Further, a control circuit 12 controls the modes according to an instruction from an external circuit (not shown).

The control circuit 12 controls vertical scanning and horizontal scanning in the display region 100*a* and supplies to an X driver 16 display data for designating grayscale levels of pixels for one row which are subjected to horizontal scanning. More particularly, according to the present embodiment, the control circuit 12 supplies a transfer start signal SPL, a clock signal ϕL, an inverted clock signal ϕLinv, and an enable signal EnL to the Y driver 13. In addition, the control circuit 12 supplies a transfer start signal SPR, a clock signal ϕR, an inverted clock signal ϕRinv, and an enable signal EnR to the Y driver 14.

Figure 5:
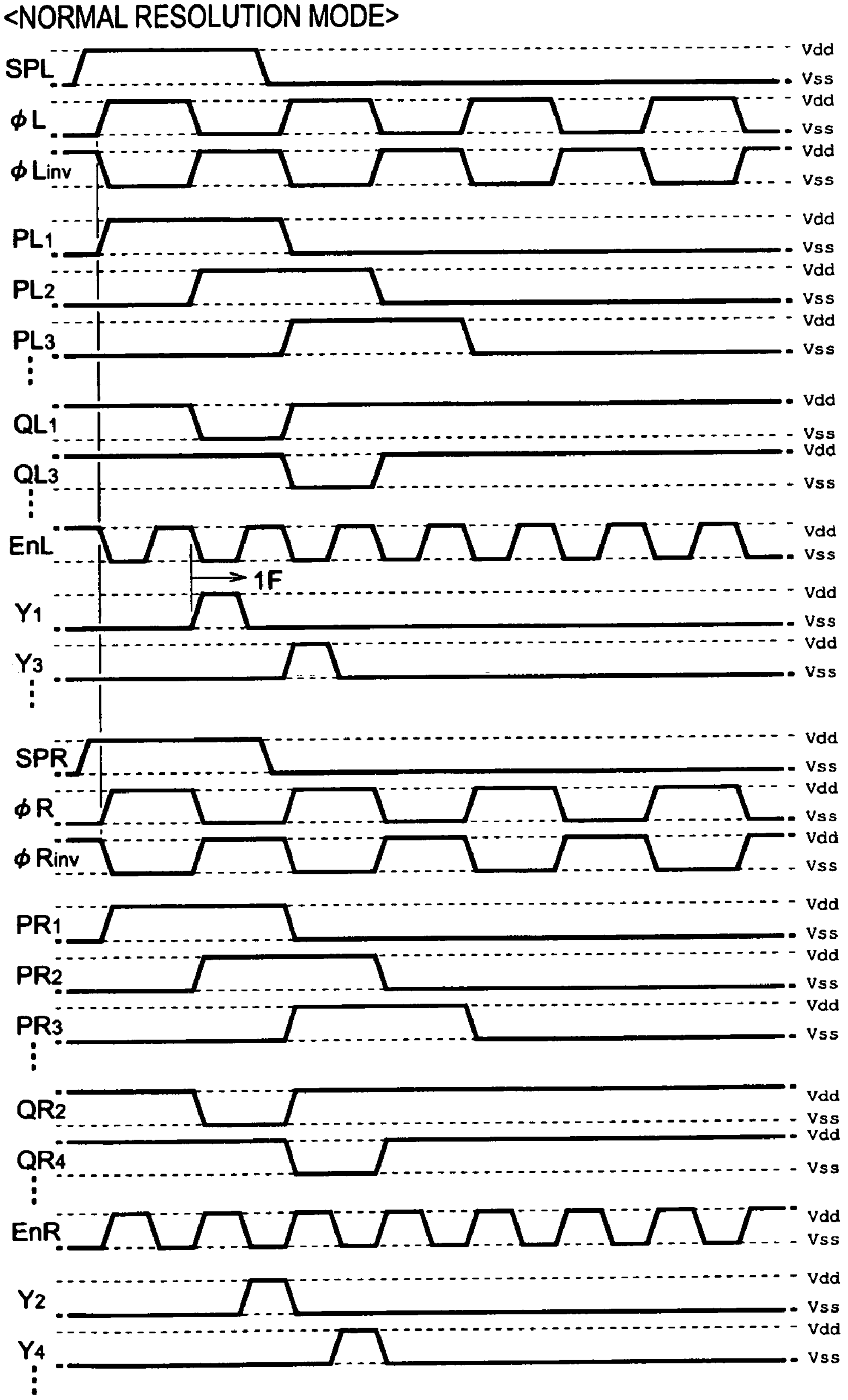
FIG. 5 is a timing chart showing an operation in a normal resolution mode.
Figure 6:
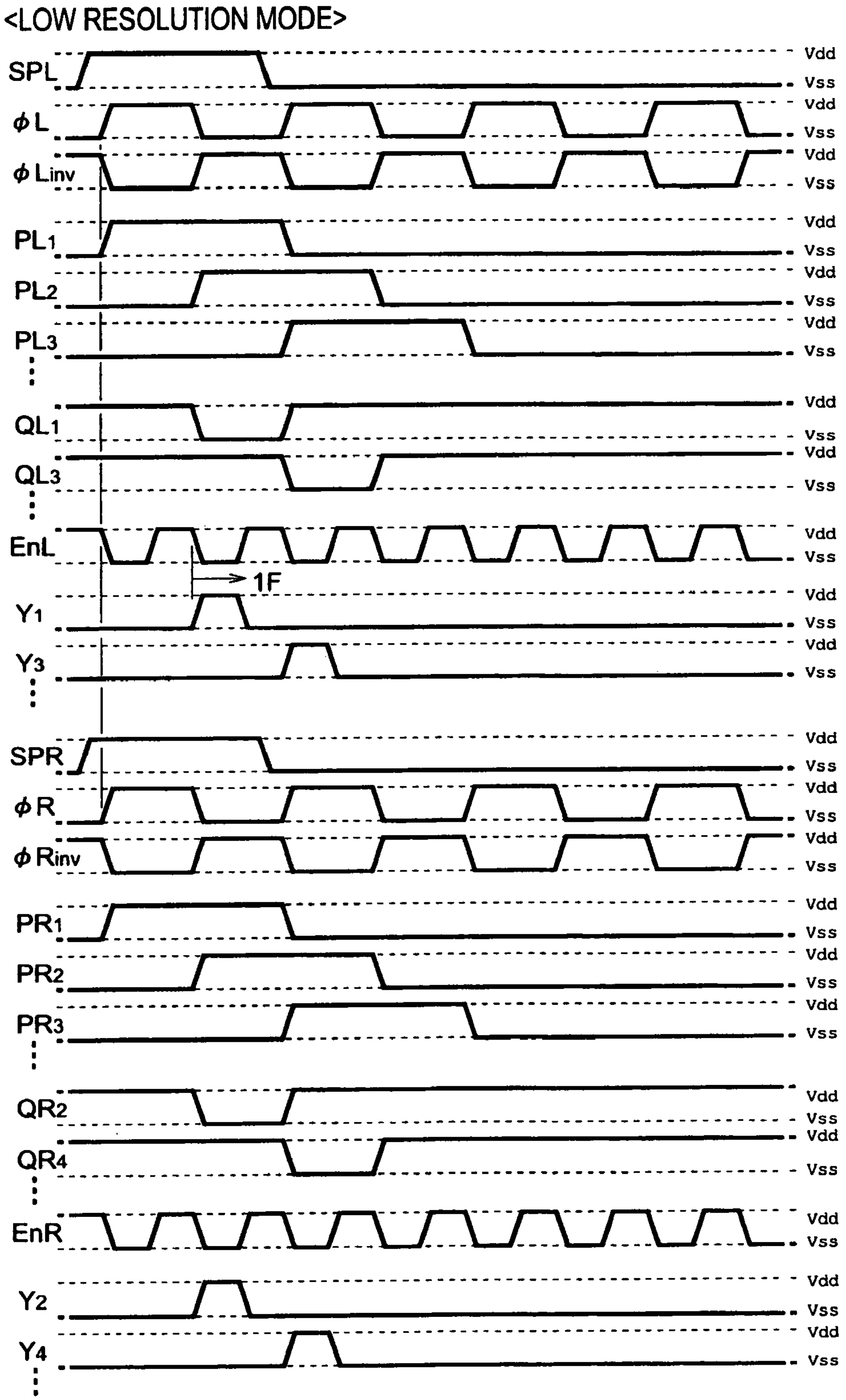
FIG. 6 is a timing chart showing an operation in a low resolution mode.

As shown in FIGS. 5 and 6, the transfer start signals SPL and SPR are pluses whose logical levels become H levels when a vertical scanning period is started. The clock signal ϕL and the inverted clock signal ϕLinv have cycles which are twice as much as one horizontal scanning period and duty ratios of 50%. The clock signal ϕL and the inverted clock signal ϕLinv are logically inverted to each other, as shown in FIGS. 5 and 6.

According to the present embodiment, the transfer start signals SPL and SPR are the same, regardless of the mode, but, for convenience, they are divided to be separately supplied to the Y drivers 13 and 14. In addition, the clock signals ϕL and ϕR (inverted clock signals ϕLinv and ϕRinv) are the same, regardless of the mode, but, for convenience, they are divided to be separately supplied to the Y drivers 13 and 14.

The enable signal EnL has a frequency which is twice as much as that of the clock signal ϕL and has a duty ratio of 50%. As shown in FIG. 5, in the normal resolution mode, a logical level of the enable signal EnL becomes a low level just after a logical level of the clock signal ϕL (inverted clock signal ϕLinv) is transited and then becomes a high level. In the low resolution mode, the enable signal EnL is also changed, as shown in FIG. 6.

In the normal resolution mode, the enable signal EnR is a signal which is obtained by inverting the logical level of the enable signal EnL, as shown in FIG. 5. However, in the low resolution mode, the enable signal EnR and the enable signal EnL are the same, as shown in FIG. 6.

Returning to FIG. 1, the Y driver (first scanning line driving circuit) 13 selects the odd-numbered (1, 3, 5, . . . , and 359) scanning lines 112 from the top in the predetermined sequence according to the mode, which will be described in detail below. In addition, the Y driver (second scanning line driving circuit) 14 selects the even-numbered (2, 4, 6, . . . , and 360) scanning lines 112 from the top in the predetermined sequence according to mode, which will be described in detail below.

The X driver 16 converts display data of pixels for one row corresponding to the selected scanning line 112 into data signals, each having a voltage suitable for driving liquid crystal, and supplies the data signals to the pixel circuits 100 through the data lines 114. Here, the data signals supplied to the data lines 114 from the first column to 480-th column are represented by $X_{-1}$, $X_{-2}$, $X_{-3}$, . . . , and $X_{-480}$.

Next, the configuration of the pixel circuit 100 will be described with reference to FIG. 2.

Figure 2:
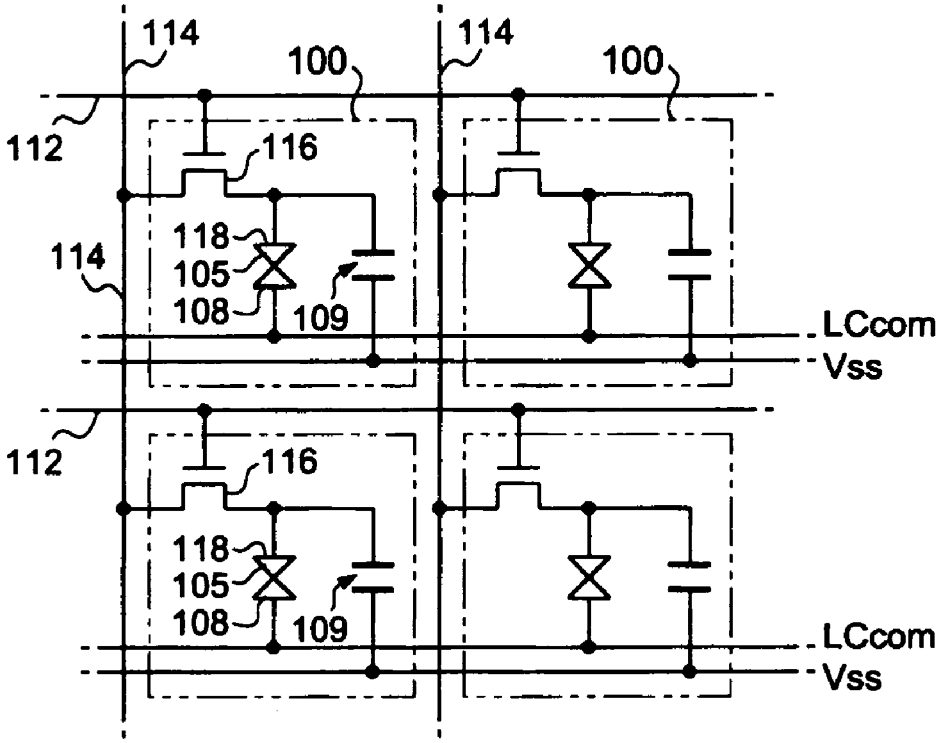
FIG. 2 is a circuit diagram showing a configuration of a pixel circuit in the electro-optical device shown in FIG. 1.

As shown in FIG. 2, in the pixel circuit 100, a source of an n-channel TFT (thin film transistor) 116 is connected to the data line 114, a drain thereof is connected to the pixel electrode 118, and a gate thereof is connected to the scanning line 112.

Further, a common electrode 108 is commonly provided with respect to all pixels so as to face the pixel electrodes 118 and is applied with a time-constant voltage LCcom. In addition, a liquid crystal layer 105 is interposed between the pixel electrodes 118 and the common electrode 108. For this reason, for each pixel, a liquid crystal capacitor having the pixel electrode 118, the common electrode 108, and the liquid crystal layer 105 is formed.

Though not shown, alignment films subjected to a rubbing treatment are respectively provided on opposite surfaces of both substrates, such that major-axis directions of liquid crystal molecules are continuously twisted by about 90 degrees between both substrates. Further, polarizers are respectively provided on rear surfaces of both substrates alignment directions.

When an effective value of a voltage applied to the liquid crystal capacitor is zero, light passing through the pixel electrode 118 and the common electrode 108 is optically activated by about 90 degrees according to the twisted liquid crystal molecules. On the contrary, when the effective voltage value increases, the liquid crystal molecules are inclined in a direction in which an electric field is applied. As a result, the optical activity is cancelled. For this reason, in a transmission type, polarizers having polarization axes orthogonal to each other according to the alignment directions are respectively arranged on the incident side and the rear surface side. In this case, if the effective voltage value approximates zero, the transmittance of light becomes the maximum, so that a white display is performed. In addition, when the effective voltage value increases, an amount of transmitted light is decreased, such that a black display having the minimum transmittance is performed (normally white mode).

In addition, in order to reduce an amount of charge leakage from the liquid crystal capacitor through the TFT 116, a storage capacitor 109 is provided for each pixel. One end of the storage capacitor 109 is connected to the pixel electrode 118 (the drain of the TFT 116) and the other end thereof is commonly connected to a lower potential Vss of a power supply over all pixels.

Moreover, the TFT 116 in the pixel circuit 100 is formed with the same manufacturing process as the transistor constituting the Y drivers 13 and 14 or the X driver 16, which results in a small device at low cost.

Here, the configuration of the Y driver 13 for driving the odd-numbered scanning lines 112 will be described with reference to FIG. 3.

Figure 3:
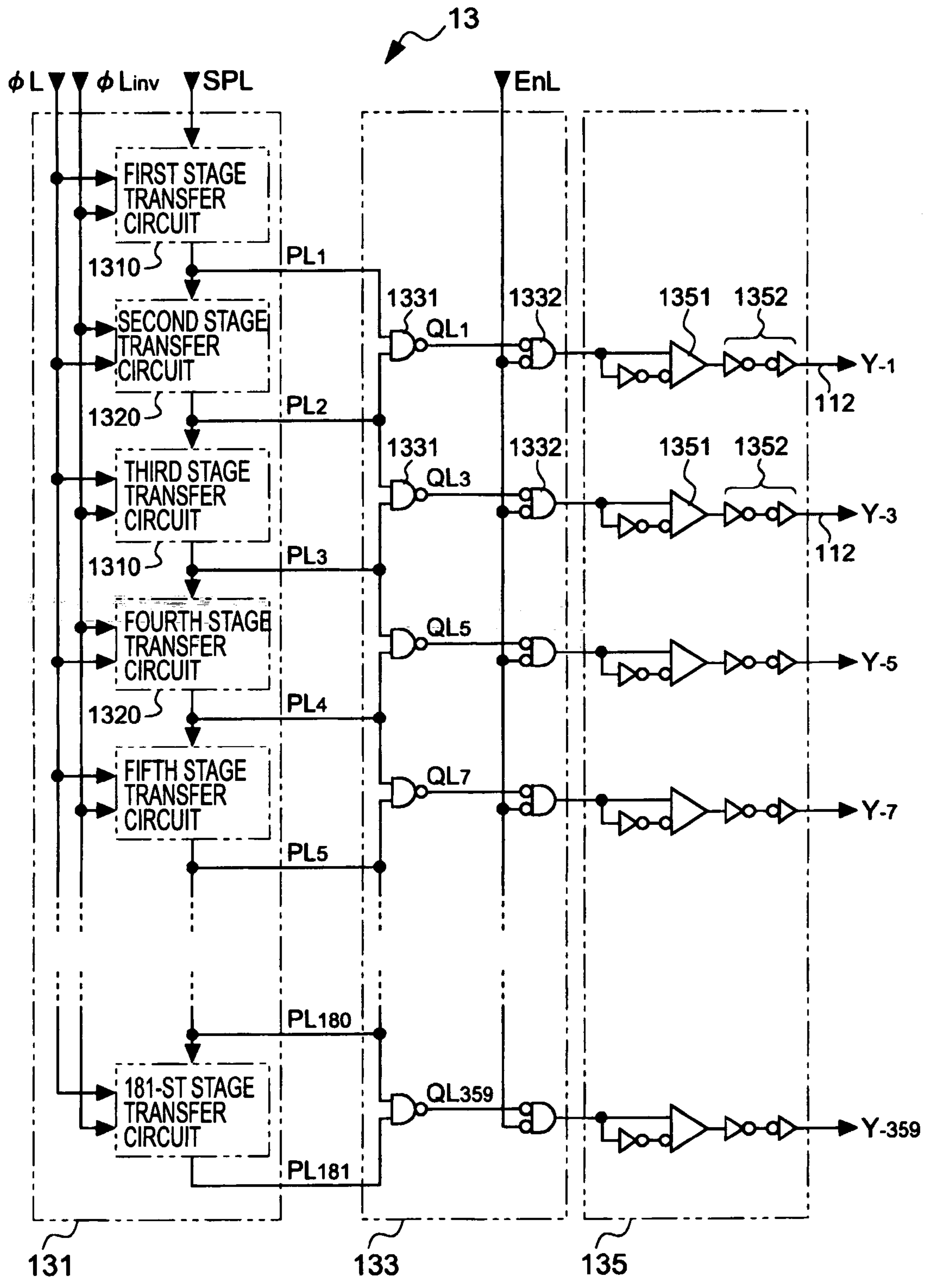
FIG. 3 is a diagram showing a configuration of a Y driver for driving odd-numbered scanning lines.

As shown in FIG. 3, the Y driver 13 has a shift register 131, an output control circuit 133, and a level shifter/buffer circuit group 135.

Among them, the shift register 131 has the configuration that odd-numbered-stage transfer circuits 1310 and even-numbered-stage transfer circuits 1320 are alternately connected at '181' stages larger than '180', which is half of the total number of the scanning lines 112, by '1' and the transfer start signal SPL is supplied to the first stage transfer circuit 1310 as an input signal.

The odd-numbered-stage transfer circuits 1310 output forward the input signals when the clock signal ϕL is the high level (when the inverted clock signal ϕLinv is the low level) and, when the clock signal ϕL is changed to the low level (when the inverted clock signal ϕLinv is changed to the high level), latch and output the output signals just before the change.

On the other hand, the even-numbered-stage transfer circuits 1320 output forward the input signals when the clock signal ϕL is the low level (when the inverted clock signal ϕLinv is the high level), and, when the clock signal ϕL is changed to the high level (when the inverted clock signal ϕLinv is changed to the low level), latch and output the output signals just before the change.

Here, for convenience, the output signals of the first, second, third, . . . , and 181-th-stage transfer circuits 1310 (or 1320) are represented by $PL_1$, $PL_2$, $PL_3$, . . . , and $PL_{181}$.

In the shift register 131, when the transfer start signal SPL becomes the high level first during in the vertical scanning period, the signal $PL_1$ becomes the high level during one cycle of the clock signal ϕL after the clock signal ϕL becomes the high level (when the inverted clock signal ϕLinv becomes the low level) and then the signals $PL_2$, $PL_3$, . . . , and $PL_{181}$ are sequentially shifted by a half of the cycle of the clock signal ϕL with respect to the signal $PL_1$ to be outputted, as shown in FIGS. 5 and 6.

As shown in FIG. 3, the output control circuit 133 has the configuration that a group of a NAND circuit 1331 and a NOR circuit 1332 is provided so as to correspond to each of the odd-numbered scanning lines 112. Of them, a NAND circuit 1331 corresponding to an i-th scanning line 112 from the top calculates a negative logical product between an output signal from a {(i+1)/2}-th-stage transfer circuit in the shift register 131 and an output signal from a [{(i+1)/2}+1]-th-stage transfer circuit which is next to the {(i+1)/2}-th-stage transfer circuit and outputs it as a signal $QL_i$. Here, i is a reference character which is used for convenience when the row of the scanning line 112 is not specified and is an integer satisfying the condition $1 \leqq i \leqq 360$. However, in the Y driver 13 that drives the odd-numbered scanning lines 112, i is an odd number.

For example, since i is 7, a NAND circuit 1331 corresponding to a seventh scanning line 112 calculates a negative logical product between an output signal $PL_4$ from a fourth-stage transfer circuit 1320 and an output signal $PL_5$ from a fifth-stage transfer circuit 1310 and outputs it as a signal $QL_7$.

In addition, a NOR circuit 1332 corresponding to an i-th scanning line 112 calculates a negative logical sum between an output signal from a NAND circuit 1331 which is provided in a pair along with the NOR circuit 1332 and the enable signal EnL.

The level shifter/buffer circuit group 135 has the configuration that a pair of a level shifter 1351 and an inverter circuit group 1352 is provided so as to correspond to each of the odd-numbered scanning lines 112. Of them, the level shifter 1351 converts a logical signal having a low amplitude into a logical signal having a high amplitude. In addition, the even number of inverters of the inverter circuit group 1352 are connected at multi-stages, sequentially increase driving capability of the high-amplitude logical signal from the level shifter 1351, and supply the high-amplitude logical signal as a scanning signal.

Here, the high level of the high-amplitude signal is a voltage Vdd and the low level of the high-amplitude signal is a voltage Vss. Further, when an i-th scanning signal is represented by $Y_{-i}$ for convenience, the logical level of the scanning signal $Y_{-i}$ of the odd-numbered scanning line is equal to that of a negative logical sum signal from the i-th NOR circuit 1332.

Figure 4:
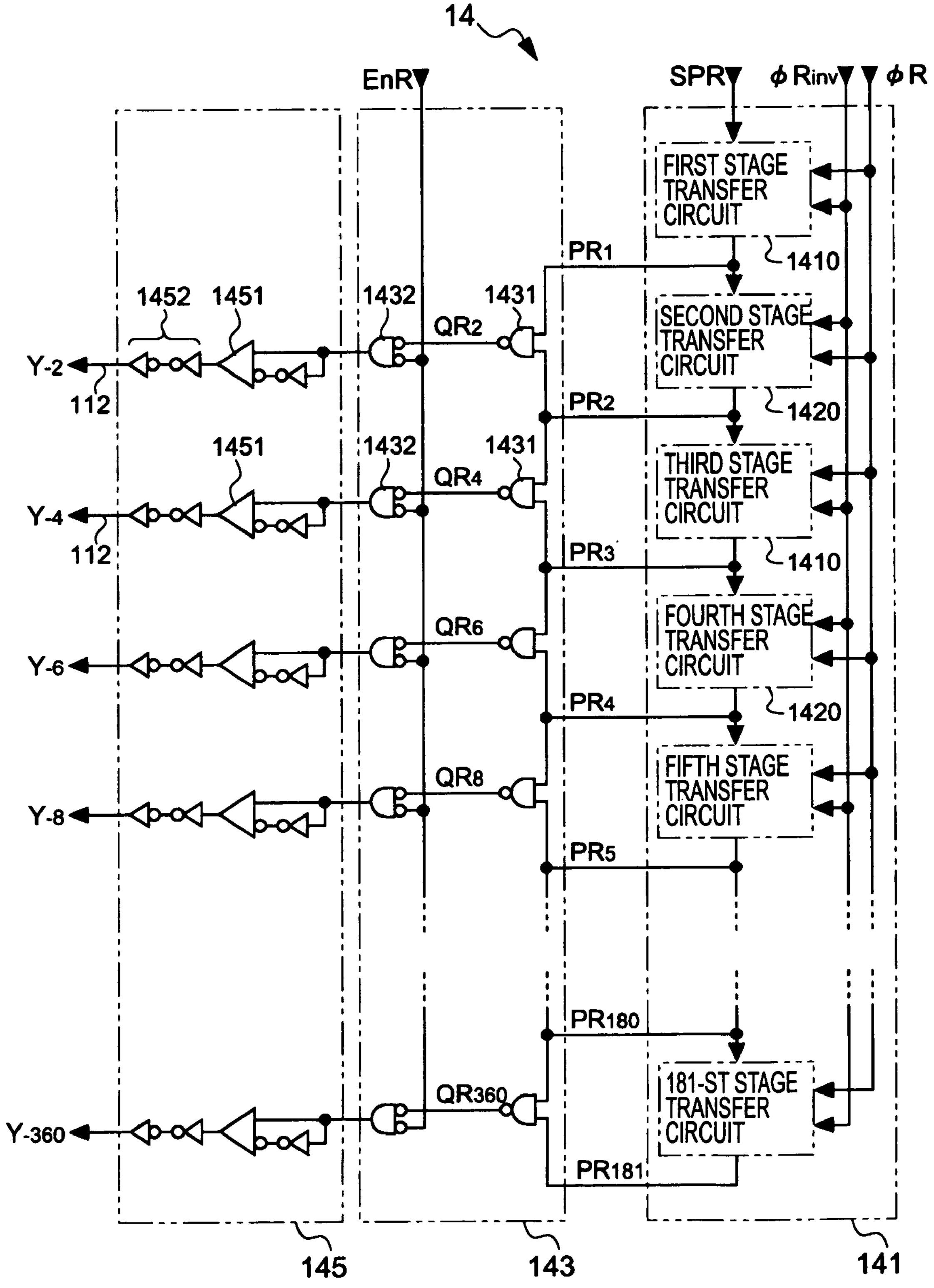
FIG. 4 is a diagram showing a configuration of a Y driver for driving even-numbered scanning lines.

As seen from FIG. 4, the Y driver 14 for driving even-numbered scanning lines 112 and the Y driver 13 are symmetric on a basis of the display region 100*a*.

Specifically, the Y driver 14 has a shift register 141, an output control circuit 143, and a level shifter/buffer circuit group 145. Of them, like the shift register 131, the shift register 141 has the configuration that odd-numbered-stage transfer circuits 1410 and even-numbered-stage transfer circuits 1420 are alternately connected at '181' stages larger than '180', which is a half of the total number of the scanning lines 112, by '1' and the transfer start signal SPR is supplied to the first-stage transfer circuit 1410 as an input signal.

Here, for convenience, the output signals of the first, second, third, . . . , and 181-th-stage transfer circuits 1410 (or 1420) are represented by $PR_1$, $PR_2$, $PR_3$, . . . , and $PR_{181}$. In the shift register 141, similarly, when the transfer start signal SPR becomes the high level first in the vertical scanning period, the signal $PR_1$ becomes the high level during one cycle of the clock signal ϕR after the clock signal ϕR becomes the high level (when the inverted clock signal ϕRinv becomes the low level) and then the signals $PR_2$, $PR_3$, . . . , and $PR_{181}$ are sequentially shifted by a half of the cycle of the clock signal ϕR with respect to the signal $PR_1$ to be outputted, as shown in FIGS. 5 and 6.

As shown in FIG. 4, the output control circuit 143 has the configuration that a group of a NAND circuit 1431 and a NOR circuit 1432 is provided so as to correspond to each of the odd-numbered scanning lines 112. Of them, a NAND circuit 1431 corresponding to an i-th scanning line 112 from the top calculates a negative logical product between an output signal from a (i/2)-th-stage transfer circuit in the shift register 141 and an output signal from a {(i/2)+1}-th-stage transfer circuit which is next to the (i/2)-th-stage transfer circuit and outputs the negative logical product as a signal $QR_i$. Here, since the description of the Y driver 14 for driving the odd-numbered scanning lines 112 is given, i is an even number.

For example, since i is 8, a NAND circuit 1431 corresponding to an eighth scanning line 112 calculates a signal of a negative logical product between an output signal $PR_4$ from a fourth-stage transfer circuit 1420 and an output signal $PR_5$ from a fifth-stage transfer circuit 1410 and outputs that signal as a signal $QR_8$.

In addition, a NOR circuit 1432 corresponding to the i-th scanning line 112 calculates a negative logical sum between an output signal from a NAND circuit 1431 which is provided in a pair along with the NOR circuit 1432 and an enable signal EnR.

The level shifter/buffer circuit group 145 has the configuration that a group of a level shifter 1451 and an inverter circuit group 1452 is provided so as to correspond to each of the even-numbered scanning lines 112. Output signals of the inverter circuit groups 1452 are supplied as the scanning signals of the even-numbered scanning lines. In addition, in the Y driver 14, the logical level of the scanning signal $Y_{-i}$ of the even-numbered scanning line is equal to that of a negative logical sum signal from the i-th NOR circuit 1432.

Next, the operation of the electro-optical device 10 will be described, laying emphasis on the Y drivers 13 and 14.

In the normal resolution mode, the control circuit 12 supplies the enable signal EnL to the Y driver 13 and supplies the enable signal EnR to the Y driver 14 such that the enable signal EnL and the enable signal EnR become the exclusive logical relationship, that is, have phases shifted by 180 degrees.

As such, in the output control circuit 133 of the Y driver 13, the i-th (odd-numbered) NAND circuit 1331 outputs a positive logical product between an output signal $PL_{(i+1)/2}$ from a {(i+1)/2}-th-stage transfer circuit in the shift register 131 and an output signal $PL_{\{(i+1)/2\}+1}$ from a [{(i+1)/2}+1]-th-stage transfer circuit which is next to the {(i+1)/2}-th-stage transfer circuit as a signal $QL_i$, as shown in FIG. 5. Therefore, of the output signals from the respective stage transfer circuits 1310 and 1320, an overlap portion of adjacent high level pulses is calculated by the NAND circuit 1331 as a low level pulse.

Further, the i-th NOR circuit 1332 outputs a signal which becomes the high level only when the signal of the i-th NAND circuit 1331 and the enable signal EnL becomes the low level. As a result, the width of the low level pulse obtained by the NAND circuit 1331 narrows to the width of the low level pulse of the enable signal EnL to be inverted, such that a high level pulse is generated. The signals are outputted as scanning signals $Y_{-1}$, $Y_{-3}$, $Y_{-5}$, . . . , and $Y_{-359}$ after the high amplitude conversion and buffering by the level shifter/buffer circuit group 135.

On the other hand, in the output control circuit 143 of the Y driver 14, the I-th (even-numbered) NAND circuit 1431 outputs a positive logical product between an output signal $PR_{i/2}$ from a (i/2)-th-stage transfer circuit in the shift register 131 and an output signal $PR_{(i/2)+1}$ from a {(i/2)+1}-th-stage transfer circuit which is next to the (i/2)-th-stage transfer circuit as a signal $QR_i$. Therefore, of the output signals from the respective stage transfer circuits 1410 and 1420, an overlap portion of adjacent high level pulses is calculated by the NAND circuit 1431 as a low level pulse.

Further, the i-th NOR circuit 1432 outputs a signal which becomes the high level only when the signal of the i-th NAND circuit 1431 and the enable signal EnR become the low level. As a result, the width of the low level pulse obtained by the NAND circuit 1431 narrows to the width of the low level pulse of the enable signal EnR to be inverted, such that a high level pulse is generated. The signals are outputted as scanning signals $Y_{-2}$, $Y_{-4}$, $Y_{-6}$, . . . , and $Y_{-360}$ after the high amplitude conversion and buffering by the level shifter/buffer circuit group 145.

Since the shift register 131 in the Y driver 13 and the shift register 141 in the Y driver 14 have the same clock signal and the same transfer start signal, the output signals $PL_1$, $PL_2$, $PL_3$, . . . , and $PL_{181}$ of the respective stage transfer circuits have the same waveforms as the output signals $PR_1$, $PR_2$, $PR_3$, . . . , and $PR_{181}$ of the respective stage transfer circuits, as shown in FIG. 5. However, since the enable signal EnR is delayed by a half of the cycle with respect to the enable signal EnL, the scanning signals $Y_{-2}$, $Y_{-4}$, . . . , and $Y_{-360}$ are also delayed by a half of the cycle of the enable signal EnL with respect to the scanning signals $Y_{-1}$, $Y_{-3}$, and $Y_{-359}$.

For this reason, in the normal resolution mode, the odd-numbered and even-numbered scanning lines 112 are alternately selected. More particularly, the scanning lines 112 are selected in an order of the first, second, third, fourth, . . . , 359-th, and 360-th. Therefore, according to the present embodiment, in the normal resolution mode, as viewed from the same column, since a different data signal is written for each row, the vertical resolution becomes 360 lines.

Here, in the normal resolution mode, when any scanning line 112 is selected and the scanning signal of the corresponding scanning line becomes the high level, the TFT 116 is turned on in the pixel circuit 100 located at the selected scanning line 112. Therefore, the voltage of the data signal is written in the pixel electrode 118. Then, even though the selection state of the corresponding scanning line is released and the TFT 116 is turned off, the voltage applied to the pixel electrode 118 is held. Therefore, in the liquid crystal element, the amount of transmitted light is determined according to an effective voltage value determined by the difference between the voltage of the data signal written in the pixel electrode 118 and the voltage applied to the common electrode 108. When the writing operation is performed over all the pixel circuits 100 by sequentially selecting the scanning lines 112 one by one, that is, vertical scanning, predetermined display is performed in the display region 100*a*.

In the low resolution mode, the control circuit 12 supplies the enable signal EnL to the Y driver 13 and supplies the enable signal EnR to the Y driver 14 such that the enable signal EnL and the enable signal EnR have the same logic, that is, the same phase.

In the low resolution mode, the shift register 131 in the Y driver 13 and the shift register 141 in the Y driver 14 are supplied with the same clock signal and transfer start signal as those in the normal resolution mode. As a result, the output signals $PL_1$, $PL_2$, $PL_3$, . . . , and $PL_{181}$ and $PR_1$, $PR_2$, $PR_3$, . . . , and $PR_{181}$ of the respective stage transfer circuits are the same waveforms as those in the normal resolution mode, as shown in FIG. 6. Therefore, of the negative logical product signals $QL_1$, $QL_2$, $QL_3$, $QL_4$, . . . , and QL359 and the negative logical product signals $QR_2$, $QR_4$, $QR_6$, . . . , and $QR_{360}$, adjacent signals have the same waveform, as shown in FIG. 6 (for example, the first and second rows and the third and forth rows).

Here, in the low resolution mode, the enable signal EnR is equal to the enable signal EnL. For this reason, of the scanning signals $Y_{-1}$, $Y_{-3}$, $Y_{-5}$, . . . , and $Y_{-359}$ obtained by exciting and inverting the negative logical product signals $QL_1$, $QL_3$, $QL_5$, . . . , and $QL_{359}$ with the low level pulse of the enable signal EnL and the scanning signals $Y_{-2}$, $Y_{-4}$, $Y_{-6}$, . . . , and $Y_{-360}$ obtained by exciting and inverting the negative logical product signals $QR_2$, $QR_4$, $QR_6$, . . . , and $QL_{360}$ with the low level pulse of the enable signal EnR, adjacent signals have the same waveform.

For this reason, in the low resolution mode, the scanning lines 112 are selected two by two in such a manner that the odd-numbered scanning line and the subsequent even-numbered scanning line are simultaneously selected. That is, as viewed from the same column, since the same data signal is written in the pixel circuits 100 disposed in the odd-numbered scanning line and the subsequent even-numbered scanning lines, the vertical resolution becomes 180 lines in the low resolution mode which is a half of 360 lines in the normal resolution mode.

Therefore, according to the present embodiment, even in the normal resolution mode or the low resolution mode, the clock signal ϕR and the inverted clock signal ϕRinv supplied to the Y driver 14 are not changed together with the clock signal ϕL and the inverted clock signal ϕLinv supplied to the Y driver 13. Further, the enable signal EnR and the enable signal EnL are the same in the low resolution mode and have the logical inversion relationship in the high resolution mode. Therefore, according to the present embodiment, even when the resolution is changed, the clock signal and the enable signal do not need to be separately generated. Therefore, the configuration can be prevented from being complicated.

Figure 7:
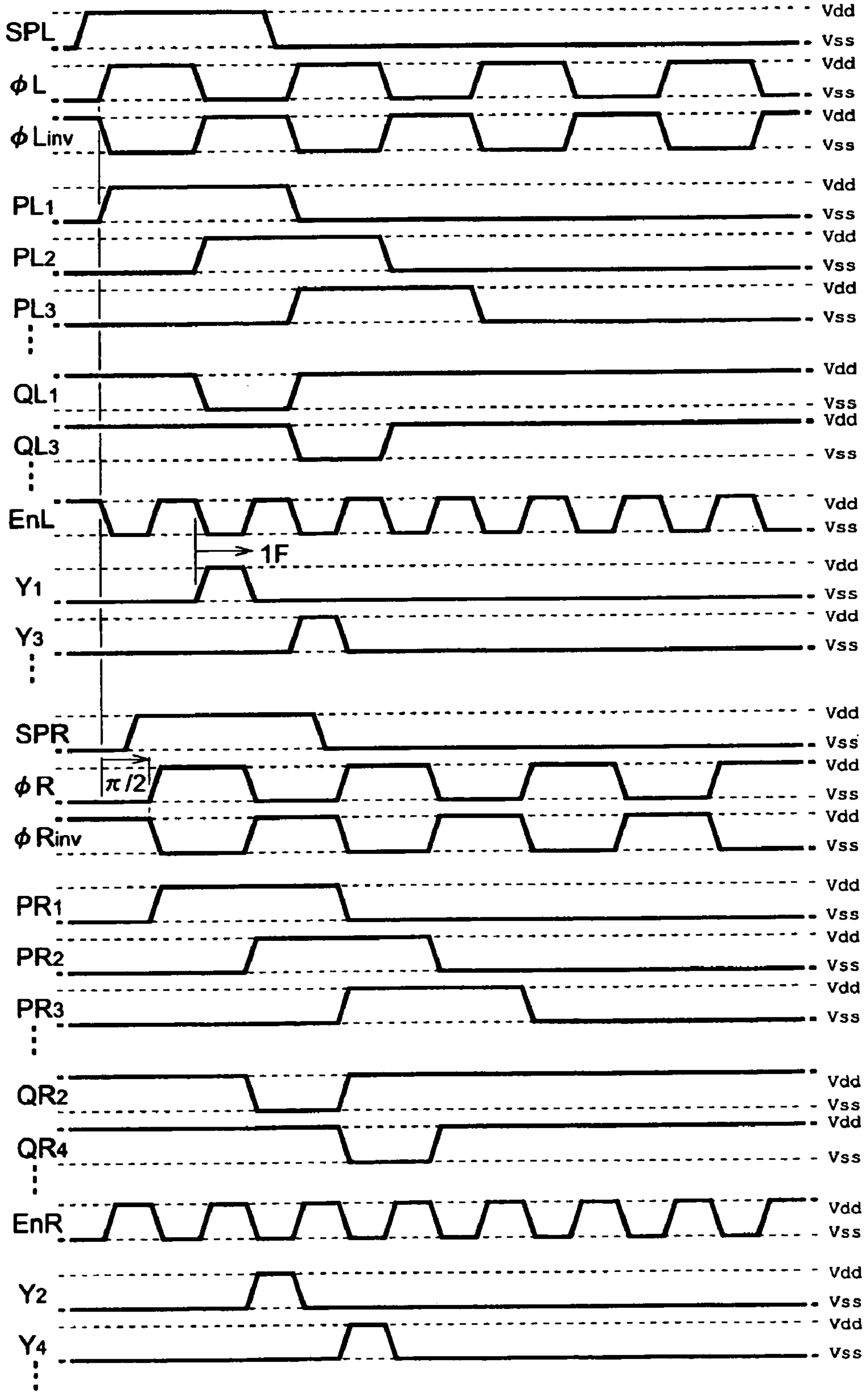
FIG. 7 is a timing chart showing a modification of the operation of the first embodiment.
Figure 8:
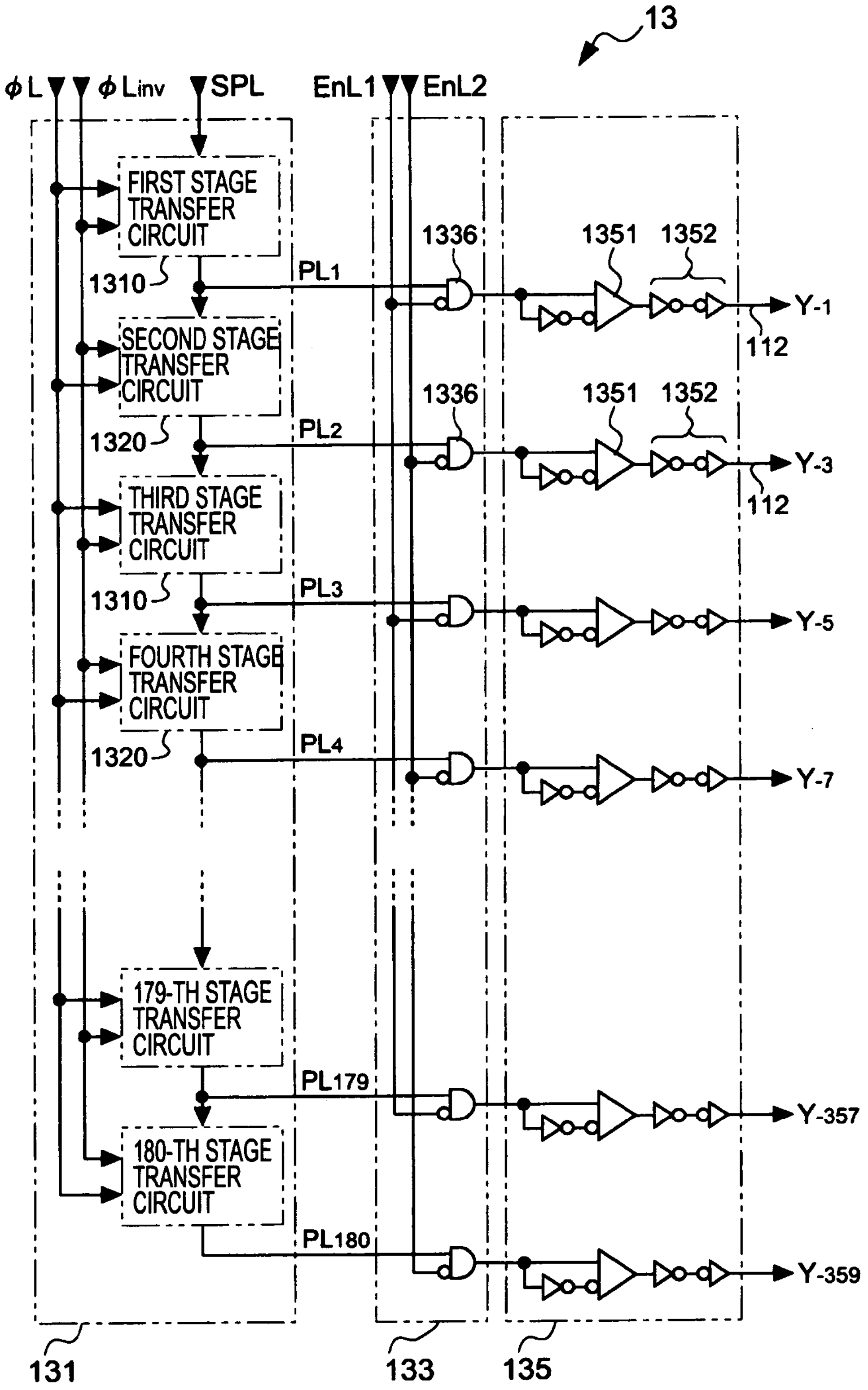
FIG. 8 is a diagram showing a configuration of a Y driver for driving odd-numbered scanning lines according to a second embodiment of the invention.

Further, according to the first embodiment, in the normal resolution mode, the clock signal ϕR (the inverted clock signal ϕRinv) and the transfer start signal SPR have the same phase as the clock signal ϕL (the inverted clock signal ϕLinv) and the transfer start signal SPL. However, the invention is not limited to this configuration. As shown in FIG. 7, in the normal resolution mode, the clock signal ϕR (the inverted clock signal ϕRinv) and the transfer start signal SPR may be delayed by 90 degrees with respect to the clock signal ϕL (the inverted clock signal ϕLinv) and the transfer start signal SPL. According to this configuration, the same advantages as those in the first embodiment can be obtained.

Next, a second embodiment of the invention will be described. An electro-optical device 10 according to the second embodiment is different from the electro-optical device according to the first embodiment in portions of Y drivers 13 and 14. More particularly, in a Y driver 13, the number of transfer circuits 1310 and 1320 in a shift register 131 is '180' which is a half of the total number of scanning lines 112. In addition, an output control circuit 133 has the configuration in which a plurality of NAND circuits 1336 are provided to correspond to the scanning lines 112, respectively. Further, in the output control circuit 133, a logical product signal between an output signal from an odd-numbered-stage transfer circuit 1310 and a negative signal of a first enable signal EnL1 is calculated and a logical product signal between an output signal from an even-numbered-stage transfer circuit 1320 and a negative signal of a second enable signal EnL2 is calculated. The logical product signals are respectively supplied to level shifters 1351 of level shifter/buffer circuit groups 135.

Figure 9:
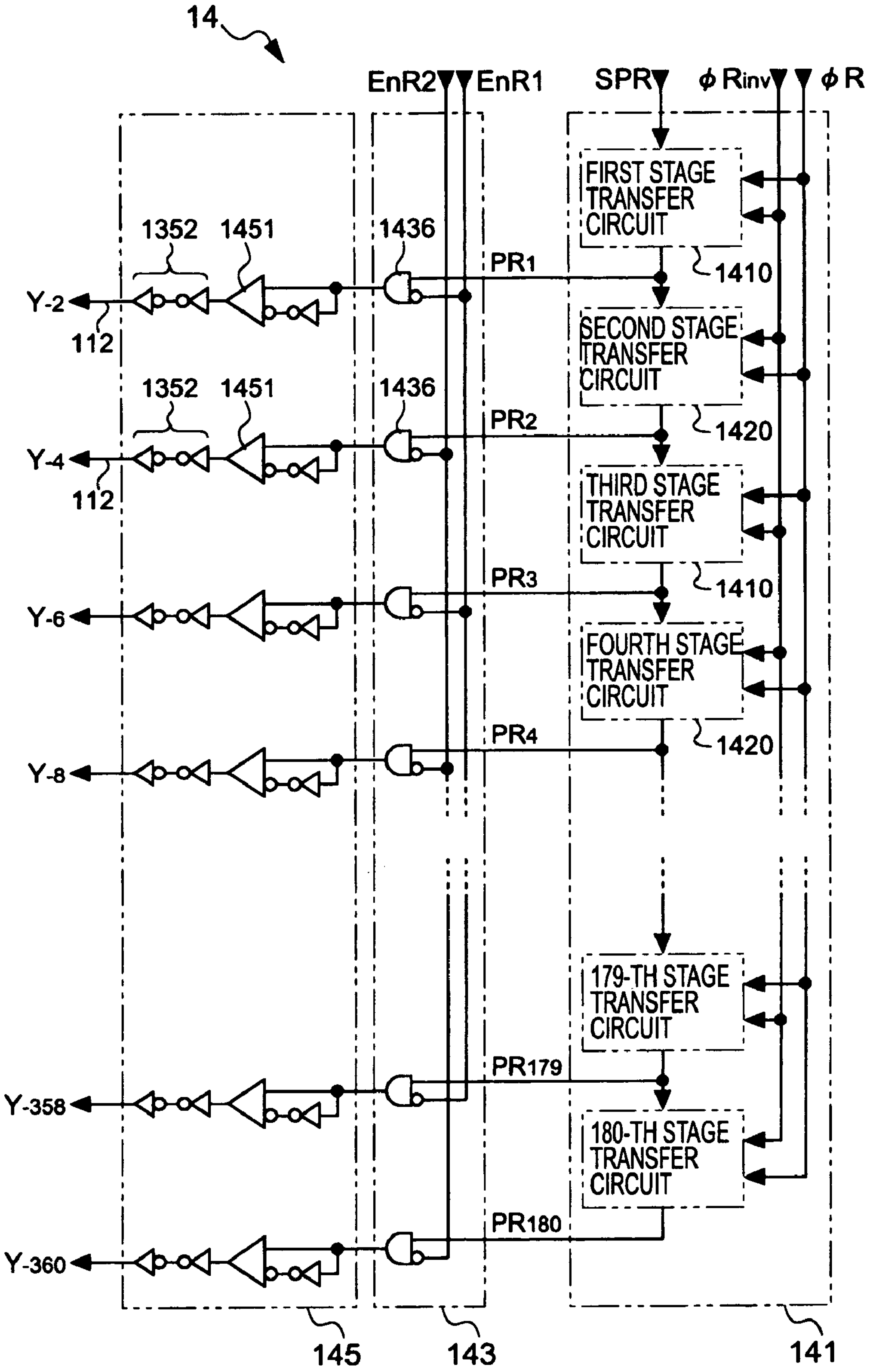
FIG. 9 is a diagram showing a configuration of a Y driver for driving even-numbered scanning lines.

As shown in FIG. 9, the Y driver 14 is symmetric to the Y driver 13 with a display region 100*a* interposed therebetween. The Y driver 14 is supplied with a first enable signal EnR1 and a second enable signal EnR2, instead of the first enable signal EnL1 and the second enable signal EnL2.

Figure 10:
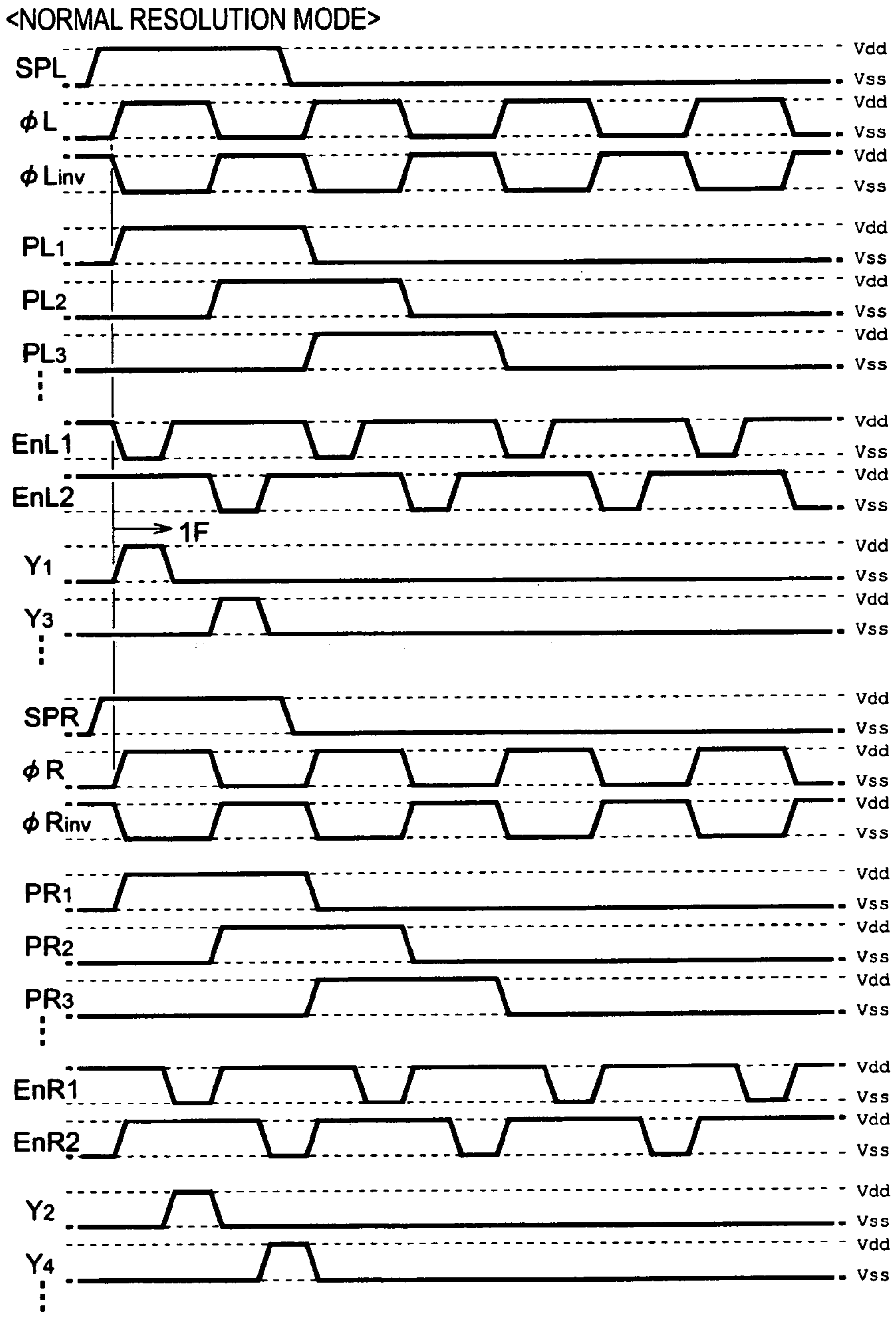
FIG. 10 is a timing chart showing an operation in a normal resolution mode.

According to the second embodiment, in a normal resolution mode, the control circuit 12 supplies to the Y driver 13, as the first enable signal EnL1, the following signal. That is, as shown in FIG. 10, the first enable signal EnL1 is a signal which becomes the low level during a half of a cycle of a high level pulse of a clock signal ϕL from a rising edge of the clock signal ϕL (that is, a quarter of a cycle of the clock signal ϕL). Further, the control circuit 12 delays the first enable signal EnL1 by a half of the cycle of the clock signal ϕL and supplies the delayed signal to the Y driver 13 as the second enable signal EnL2. Furthermore, the control circuit 12 delays the first enable signal EnL1 by a quarter of the cycle of the clock signal ϕL (that is, a cycle of a low level pulse of the first enable signal EnL1) and supplies the delayed signal to the Y driver 14 as the first enable signal EnR1. In the same manner, the control circuit 12 delays the second enable signal EnL2 by a quarter of the cycle of the clock signal ϕL and supplies the delayed signal to the Y driver 14 as the second enable signal EnR2.

Figure 11:
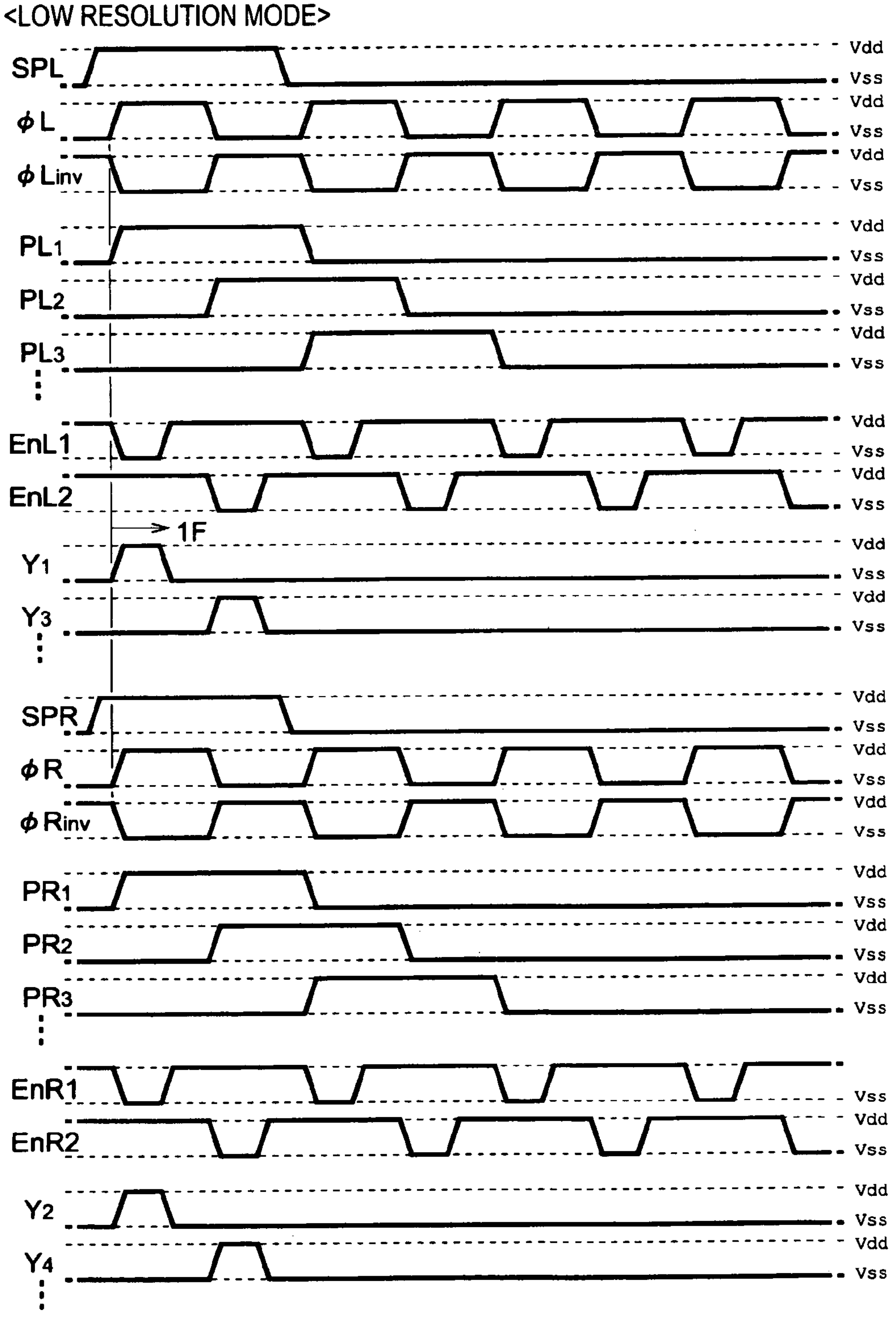
FIG. 11 is a timing chart showing an operation in a low resolution mode.

According to the second embodiment, in a low resolution mode, the control circuit 12 does not change the first enable signal EnL1 and the second enable signal EnL2, unlike the normal resolution mode, as shown in FIG. 11. However, in the low resolution mode, the control circuit 12 allows the first enable signal EnR1 and the second enable signal EnR2 supplied to the Y driver 14 to be the same as the first enable signal EnL1 and the second enable signal EnL2 supplied to the Y driver 13.

Like the first embodiment, according to the second embodiment, in the normal resolution mode, the odd-numbered scanning line and the even-numbered scanning line are alternately selected. More particularly, the scanning lines are selected in an order of the first, second, third, fourth, . . . , 359-th, and 360-th, as shown in FIG. 10. As a result, the vertical resolution becomes 360 lines. In addition, in the low resolution mode, the odd-numbered scanning line 112 and the subsequent even-numbered scanning line 112 are simultaneously selected two by two, as shown in FIG. 11. Therefore, the vertical resolution becomes 180 lines in the low resolution mode which is a half of 360 lines in the normal resolution mode.

Therefore, according to the second embodiment, the clock signal ϕR (inverted clock signal ϕRinv) equal to the clock signal ϕL (inverted clock signal ϕLinv) can be used, regardless of the change of the resolution. In addition, in the normal resolution mode, the first enable signal EnR1 and the second enable signal EnR2 supplied to the Y driver 14 are obtained by delaying the first enable signal EnL1 and the second enable signal EnL2 supplied to the Y driver 13 by a quarter of the cycle of the clock signal ϕL. For this reason, like the first embodiment, according to the second embodiment, since the clock signal or enable signal does not need to be separately generated at the time of the change of the resolution, the configuration can be prevented from being complicated.

In addition, the first embodiment may have the configuration that, in the low resolution mode, the enable signal EnL (EnR) constantly has the low level and the negative logical sum signal of the NOR circuit 1332 (1432) is supplied to the level shifter/buffer circuit group 135. According to this configuration, the selection period of the odd-numbered scanning line and the subsequent even-numbered scanning line can be doubled.

In the same manner, in the second embodiment, if the first enable signal EnL1 (EnR1) has the same waveform as the inverted clock signal ϕLinv (ϕRinv) and the second enable signal EnL2 (EnR2) has the same waveform as the clock signal ϕL (ϕR), the selection period of the odd-numbered scanning line and the subsequent even-numbered scanning line can be doubled.

In the above-described embodiments, positive logic circuits are basically provided, but negative logic circuits may be provided. In addition, according to the respective embodiments, the normally white mode is used, in which, when the effective voltage values of the common electrode 108 and the pixel electrode 118 are small, a white display is performed. However, a normally black mode for performing a black display may be used.

In addition, according the above-described embodiments, the TN-type liquid crystal is used as the liquid crystal. Alternatively, bi-stable liquid crystal having a memory property, such as BTN (bi-stable twisted nematic) liquid crystal and ferroelectric liquid crystal, polymer-dispersed liquid crystal, and GH (guest host)-type liquid crystal which is obtained by dissolving a pigment (guest) having anisotropy in absorbing visible light in a major-axis direction and a minor-axis direction of molecules into liquid crystal having constant molecule arrangement (host) and by arranging dye molecules to be parallel to the liquid crystal molecules, can be used.

In addition, a vertical alignment (homeotropic alignment) may be used, in which, when a voltage is not applied, the liquid crystal molecules are arranged in a vertical direction with respect to both substrates and, when a voltage is applied, the liquid crystal molecules are arranged in a horizontal direction with respect to both substrates. Further, a horizontal alignment (homogeneous alignment) may be used, in which, when a voltage is not applied, the liquid crystal molecules are arranged in a horizontal direction with respect to both substrates and, when a voltage is applied, the liquid crystal molecules are arranged in a vertical direction with respect to both substrates. As such, the invention can be applied to various configurations with respect to the liquid crystal or alignment direction.

In the above-described embodiments, the liquid crystal device has been described. However, the invention is not limited to the liquid crystal device. For example, the invention may be applied to a device using an EL (electronic luminescent) element, an electron emission element, an electrophoresis element, and a digital mirror element, or a plasma display device.

Figure 12:
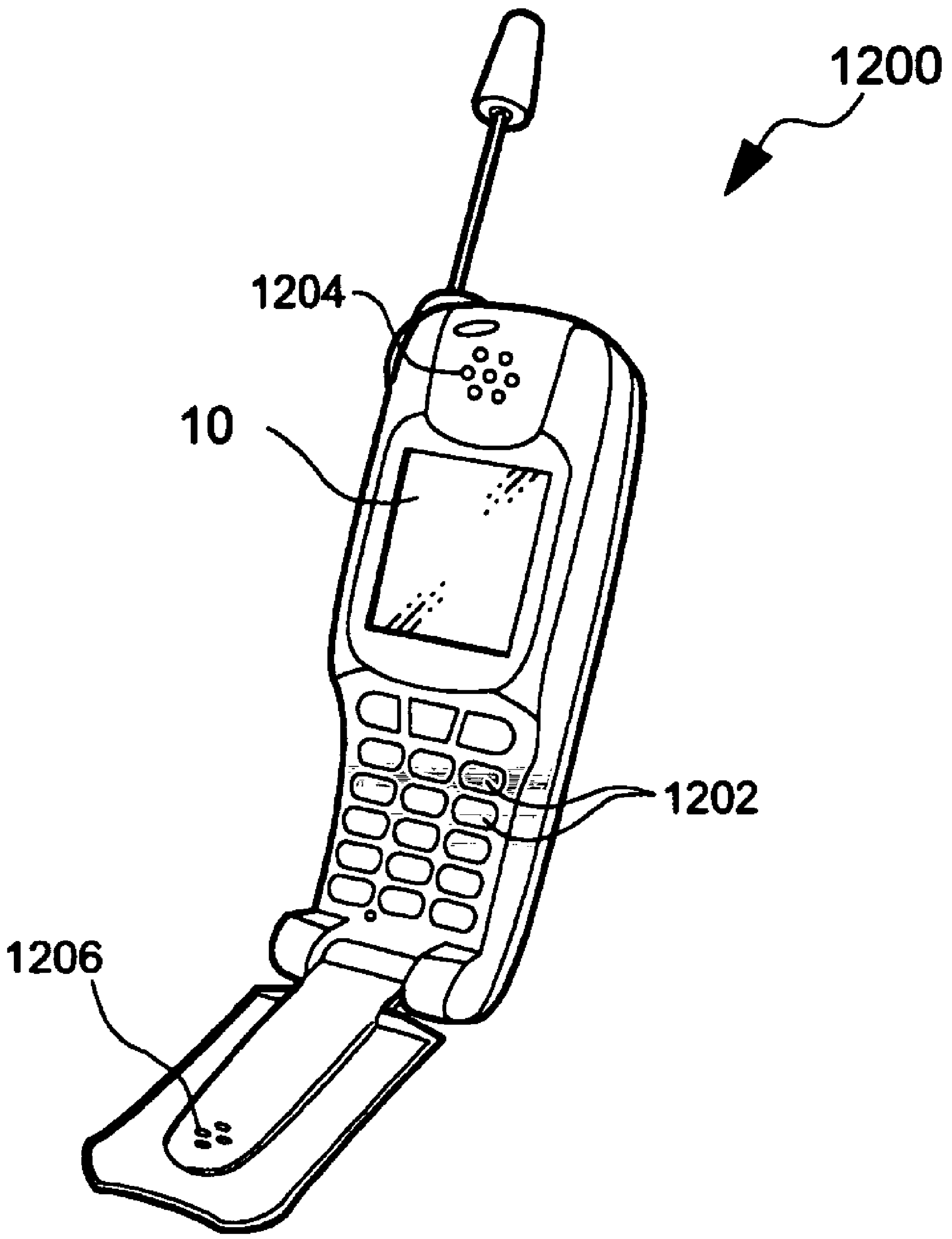
FIG. 12 is a perspective view showing a configuration of a cellular phone to which an electro-optical device is applied.

Next, as described above, an example of an electronic apparatus to which the above-described electro-optical device 10 is applied will be described. FIG. 12 is a perspective view showing the configuration of a cellular phone to which the above-described electro-optical device 10 is applied as a display unit.

In FIG. 12, the cellular phone 1200 includes a plurality of operating buttons 1202, a receiver 1204, a transmitter 1206, and the electro-optical device 10. In addition, as the electronic apparatus, in addition to the cellular phone shown in FIG. 12, direct-view-type devices, such as a liquid crystal television, a view-finder-type or monitor-direct-view-type video tape recorder, a car navigation device, a pager, an electronic organizer, an electronic calculator, a word processor, a workstation, a video phone, a POS terminal, and a touch panel, and a projection-type device, such as a projector in which reduced images are formed and projected in enlarged scales can be exemplified.

What is claimed is:

1. A method of driving an electro-optical device, the device comprising:

pixel circuits arranged corresponding to intersections of a plurality of scanning lines and a plurality of data lines;

a first scanning line driving circuit that selects odd-numbered lines from among the plurality of scanning lines in a predetermined sequence;

a second scanning line driving circuit that selects even-numbered lines from among the plurality of scanning lines in a predetermined sequence; and a data line driving circuit that supplies data signals corresponding to grayscale levels of pixels to pixel circuits corresponding to selected scanning lines through data lines;

the first and second scanning line driving circuits comprising:

a shift register that generates output signals that select scanning lines in a predetermined sequence by a shift operation of a pulse signal by a clock signal; and an output control circuit that narrows the output signals to pulse widths of enable signals and outputs the output signals as scanning signals that select scanning lines, the method comprising:

in a predetermined first mode, supplying enable signals whose phases are different from each to the first and second scanning line driving circuits, and alternately selecting the odd-numbered and even-numbered scanning lines; and in a second mode different from the first mode, supplying enable signals with substantially the same phase to the first and second scanning line driving circuits, and simultaneously selecting two of the scanning lines, the two scanning lines being an even-numbered line and an odd-numbered line that are adjacent to each other, wherein the output control circuit provided in each of the first and second scanning line driving circuits comprises:

a first logic circuit that generates a logic signal based on a first output signal of a first level output by the shift register and a second output signal of a second level adjacent to the first level; and a second logic circuit that generates the scanning signal based on the logic signal and the enable signal, and within a logic signal pulse generation period in which the logic signal changes from a predetermined level to a level different from the predetermined level, a scanning signal pulse is generated, which corresponds to the logic signal which changes from the predetermined level to the level different from the predetermined level, and the width of the logic signal pulse is wider than that of the scanning signal pulse, wherein the enable signals are pulse signals having a duty ratio of substantially 50%, and in the case of the first mode, the phase of the enable signal that is supplied to the second scanning line driving circuit is shifted by substantially 180 degrees with respect to the phase of the enable signal that is supplied to the first scanning line driving circuit.

2. A method of driving an electro-optical device, the device comprising:

pixel circuits arranged corresponding to intersections of a plurality of scanning lines and a plurality of data lines;

a first scanning line driving circuit that selects odd-numbered lines from among the plurality of scanning lines in a predetermined sequence;

a second scanning line driving circuit that selects even-numbered lines from among the plurality of scanning lines in a predetermined sequence; and a data line driving circuit that supplies data signals corresponding to grayscale levels of pixels to pixel circuits corresponding to selected scanning lines through data lines;

the first and second scanning line driving circuits comprising:

a shift register that generates output signals that select scanning lines in a predetermined sequence by a shift operation of a pulse signal by a clock signal; and an output control circuit that narrows the output signals to pulse widths of enable signals and outputs the output signals as scanning signals that select scanning lines, the method comprising:

in a predetermined first mode, supplying enable signals whose phases are different from each to the first and second scanning line driving circuits, and alternately selecting the odd-numbered and even-numbered scanning lines; and in a second mode different from the first mode supplying enable signals with substantially the same phase to the first and second scanning line driving circuits, and simultaneously selecting two of the scanning lines, the two scanning lines being an even-numbered line and an odd-numbered line that are adjacent to each other, wherein the output control circuit provided in each of the first and second scanning line driving circuits comprises:

a first logic circuit that generates a logic signal based on a first output signal of a first level output by the shift register and a second output signal of a second level adjacent to the first level; and a second logic circuit that generates the scanning signal based on the logic signal and the enable signal, and within a logic signal pulse generation period in which the logic signal changes from a predetermined level to a level different from the predetermined level, a scanning signal pulse is generated, which corresponds to the logic signal which changes from the predetermined level to the level different from the predetermined level, and the width of the logic signal pulse is wider than that of the scanning signal pulse, wherein the output control circuit is divided into a circuit group that narrows the output signals to a pulse width of a first series of enable signals and selects a first series of scanning lines, and a circuit group that narrows the output signals to a pulse width of a second series of enable signals in which the phase is shifted by substantially 180 degrees from the enable signals of the first series, in the first mode, the phases of the enable signals of the first and second series supplied to the first scanning line driving circuit and the phases of the enable signals of the first and second series supplied to the second scanning driving circuit are shifted by substantially 90 degrees and supplied, and in the second mode, the phases of the enable signals of the first and second series supplied to the first scanning line driving circuit and the phases of the enable signals of the first and second series supplied to the second scanning driving circuit are supplied as substantially the same phase.

* * * * *